US008209700B2

(12) United States Patent
Andreev et al.

(10) Patent No.: US 8,209,700 B2
(45) Date of Patent: Jun. 26, 2012

(54) SYSTEM, METHOD, AND PROGRAM PRODUCT FOR PROVIDING LOCAL LOAD BALANCING FOR HIGH-AVAILABILITY SERVERS

(75) Inventors: Dmitry Andreev, Port Chester, NY (US); Thomas M. Dauffenbach, Prior Lake, MN (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1698 days.

(21) Appl. No.: 11/315,058

(22) Filed: Dec. 22, 2005

(65) Prior Publication Data

US 2007/0150594 A1    Jun. 28, 2007

(51) Int. Cl.
*G06F 9/46* (2006.01)
*G06F 11/00* (2006.01)
*G06F 15/16* (2006.01)
*G06F 15/173* (2006.01)

(52) U.S. Cl. ........ 718/105; 709/223; 709/224; 709/230; 709/231; 370/235; 714/1; 714/2

(58) Field of Classification Search .................. 370/235; 718/105; 709/230–232; 726/23–24
See application file for complete search history.

(56) References Cited

U.S. PATENT DOCUMENTS

| | | | | |
|---|---|---|---|---|
| 6,701,440 B1* | 3/2004 | Kim et al. | | 726/24 |
| 6,785,732 B1* | 8/2004 | Bates et al. | | 709/232 |
| 6,871,347 B2* | 3/2005 | Hay | | 718/105 |
| 7,051,115 B2* | 5/2006 | Chen et al. | | 709/245 |
| 7,139,791 B1* | 11/2006 | Coleman | | 709/203 |
| 7,272,653 B2* | 9/2007 | Levy-Abegnoli et al. | | 709/229 |
| 7,299,361 B1* | 11/2007 | Kim et al. | | 713/188 |
| 7,315,896 B2* | 1/2008 | Van Hensbergen et al. | | 709/228 |
| 7,711,844 B2* | 5/2010 | Schuehler et al. | | 709/238 |
| 2002/0040402 A1* | 4/2002 | Levy-Abegnoli et al. | | 709/229 |
| 2003/0028636 A1* | 2/2003 | Cherkasova et al. | | 709/225 |
| 2003/0069968 A1* | 4/2003 | O'Neil et al. | | 709/225 |
| 2003/0177253 A1* | 9/2003 | Schuehler et al. | | 709/230 |
| 2006/0080388 A1* | 4/2006 | Cherkasova et al. | | 709/203 |

OTHER PUBLICATIONS

Mao et al., "Cluster-Based Online Monitoring System of Web Traffic", pp. 47-53, ACM, 2001.*
Schuehler et al., "TCP-Splitter: A TCP/IP Flow Monitor in Reconfiguraable Hardware", pp. 1-6, IEEE, 2003.*

* cited by examiner

*Primary Examiner* — Jennifer To
(74) *Attorney, Agent, or Firm* — Hoffman Warnick LLC; William E. Schiesser

(57) ABSTRACT

The present invention is directed to a method, system, and computer program product for providing local load balancing for high-availability servers. In particular, the present invention is based on the use of an HACMP cluster of servers (for high availability) each running an instance of a TCP splitter (for load balancing). A cluster of servers is provided, wherein a Transport Control Protocol (TCP) splitter runs on each of the servers. Each TCP splitter is configured to split an incoming data stream to a respective server among a plurality of the servers for processing. Each server in the cluster has a different routable Internet Protocol (IP) address. Upon a failure of a server, the IP address of the failed server is reassigned to another server in the cluster.

19 Claims, 4 Drawing Sheets

SYSTEM, METHOD, AND PROGRAM PRODUCT FOR PROVIDING LOCAL LOAD BALANCING FOR HIGH-AVAILABILITY SERVERS

FIELD OF THE INVENTION

The present invention generally relates to servers, and more specifically relates to a system, method, and program product for providing local load balancing for high-availability servers (e.g., TCP servers).

BACKGROUND OF THE INVENTION

Many applications acting as Transport Control Protocol (TCP) servers rely upon external means to provide high availability, such as High Availability Cluster Multi-Processing (HACMP™), which is available from International Business Machines. In some HACMP clusters of servers (e.g., in an HACMP cluster of SMTP servers), only one of the servers is active at any moment, while the remaining servers remain on hot standby. This is an inefficient use of hardware resources. Consequently, a need for load balancing arises to optimize the load distribution among such servers. However, whenever there are a plurality of clients, and if the server and the clients are controlled by the same entity (e.g., reside within single data center), there seldom is a compelling reason to deploy dedicated load balancing devices that are known to be expensive.

SUMMARY OF THE INVENTION

In general, the present invention is directed to a method, system, and computer program product for providing local load balancing for high-availability servers (e.g., TCP servers). In particular, the present invention is based on the use of an HACMP cluster of servers (for high availability) each running an instance of a TCP splitter (for load balancing).

A first aspect of the present invention is directed to a method for providing load balancing, comprising: providing a cluster of servers; and running a Transport Control Protocol (TCP) splitter on each of the servers, wherein each TCP splitter is configured to split an incoming data stream to a respective server among a plurality of the servers for processing.

A second aspect of the present invention is directed to a system for providing load balancing, comprising: a cluster of servers; and a Transport Control Protocol (TCP) splitter on each of the servers, wherein each TCP splitter is configured to split an incoming data stream to a respective server among a plurality of the servers for processing.

A third aspect of the present invention is directed to a program product stored on a computer readable medium for providing local load balancing, the computer readable medium comprising program code for performing the following steps: providing a Transport Control Protocol (TCP) splitter on each of a plurality of servers in a cluster; and splitting, using a TCP splitter, an incoming data stream to a respective server among a plurality of the servers for processing.

A fourth aspect of the present invention is directed to a method for deploying an application for providing local load balancing, comprising: providing a computer infrastructure being operable to: provide a Transport Control Protocol (TCP) splitter on each of a plurality of servers in a cluster; and split, using a TCP splitter, an incoming data stream to a respective server among a plurality of the servers for processing.

A fifth aspect of the present invention is directed to computer software embodied in a propagated signal for providing local load balancing, the program product comprising program code for causing a computer system to perform the following steps: providing a Transport Control Protocol (TCP) splitter on each of a plurality of servers in a cluster; and splitting, using a TCP splitter, an incoming data stream to a respective server among a plurality of the servers for processing.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings in which.

Figure 1:
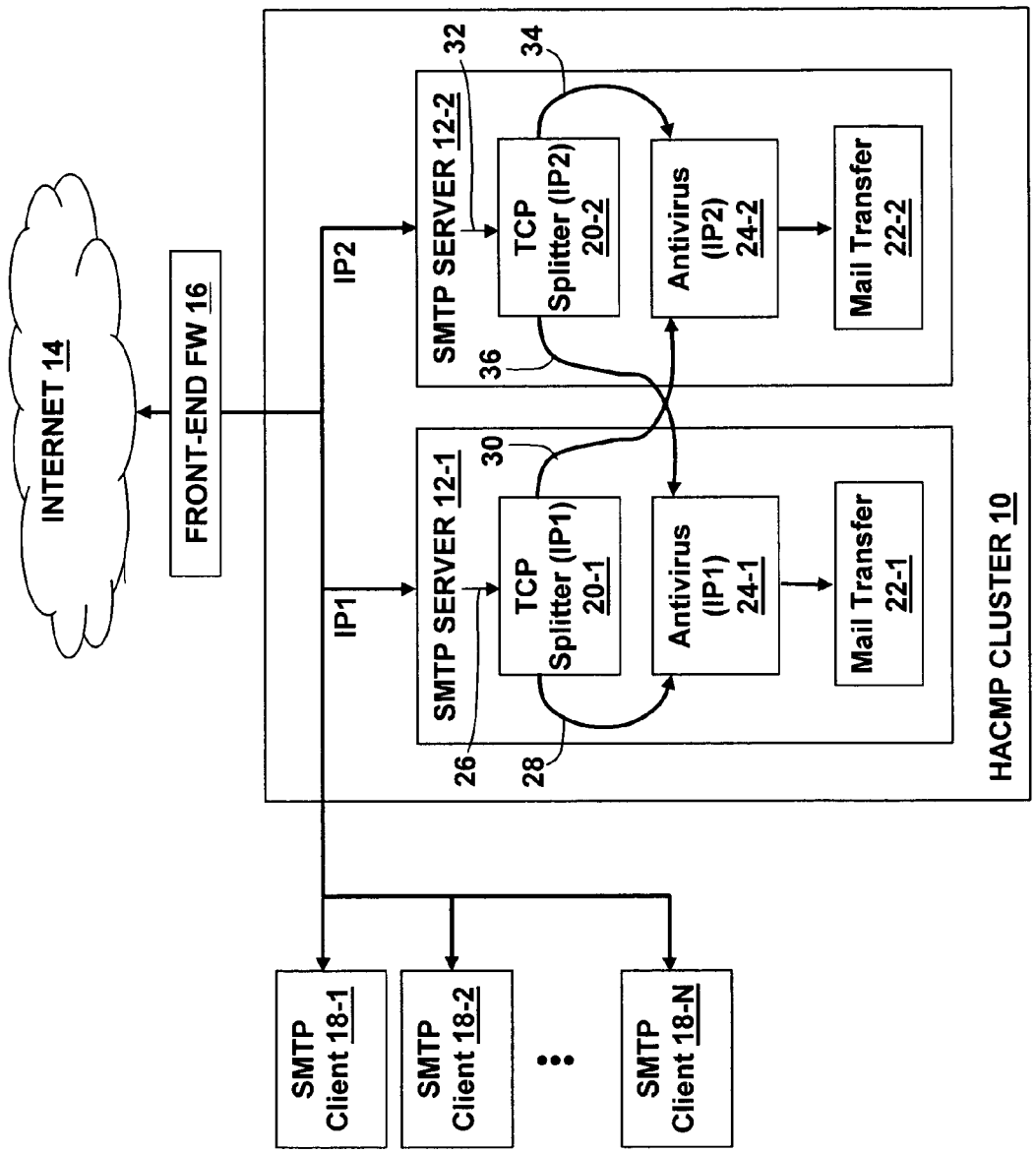
FIG. 1 depicts an illustrative HACMP server cluster with load balancing in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention is directed to a method, system, and computer program product for providing local load balancing for high-availability servers (e.g., TCP servers). In particular, the present invention is based on the use of an HACMP cluster of servers (for high availability) each running an instance of a TCP splitter (for load balancing).

An example of a TCP server in need of an external load balancing is a Simple Mail Transport Protocol (SMTP) server together with a multitude of internal SMTP clients (e.g., application servers initiating outgoing e-mail notifications to end users). Due to lack of Mail eXchange (MX) record support by most applications acting as SMTP clients, the high availability provisions for SMTP Relays are implemented via HACMP.

An illustrative HACMP server cluster 10 with load balancing in accordance with an embodiment of the present invention is depicted in FIG. 1. Although the HACMP server cluster 10 is shown as including two SMTP servers 12 (SMTP server 12-1 and SMTP server 12-2), the HACMP server cluster 10 could include any plurality of SMTP servers 12.

The HACMP server cluster 10 is connected to the Internet 14 through a front-end firewall (FW) 16 that allows inbound/outbound TCP connections to/from SMTP server 12-1 and SMTP server 12-2, which have different routable IP addresses (e.g., IP1 for the SMTP server 12-1 and IP2 for the SMTP server 12-2). One or more SMTP clients 18 (SMTP client 18-1, SMTP client 18-2, . . . , SMTP client 18-N) are connected to the HACMP server cluster 10. Each SMTP client 18 is configured to exclusively use either the SMTP server 12-1 or the SMTP server 12-2.

Each SMTP server 12 includes a TCP splitter 20 for providing load balancing. A TCP splitter 20 is a TCP proxy that listens on a port and, while being transparent to both client and server processes, redirects all incoming TCP connections to an IPaddress:Port socket that is randomly chosen from a predefined list of IPaddress:Port pairs. To improve the security, a TCP splitter 20 can be configured to serve connections only from specific IP addresses and/or subnets.

Each SMTP server 12 includes a mail transfer program 22 (e.g., Sendmail), and may optionally include an antivirus program 24, and/or other program(s) (e.g., antispam) commonly provided/utilized on SMTP servers. In FIG. 1, for example, the SMTP server 12-1 includes a TCP splitter 20-1, a mail transfer application 22-1, and an antivirus program 24-1. Similarly, the SMTP server 12-2 includes a TCP splitter 20-2, a mail transfer application 22-2, and an antivirus program 24-2.

During normal operation, each SMTP client 18 is configured to exclusively use one or the other of the SMTP servers 12, while the TCP splitter 20 in each SMTP server 12 is configured to split an incoming email stream from an SMTP client 18 among a plurality (two in this example) of available antivirus programs 24. In FIG. 1, for example, the TCP splitter 20-1 in the SMTP server 12-1 splits an incoming email stream 26 between the antivirus program 24-1 running on the SMTP server 12-1 (as indicated by arrow 28), and the antivirus program 24-2 running on the SMTP server 12-2 (as indicated by arrow 30). Further, the TCP splitter 20-2 in the SMTP server 12-2 splits an incoming email stream 32 between the antivirus program 24-2 running on the SMTP server 12-2 (as indicated by arrow 34), and the antivirus program 24-1 running on the SMTP server 12-1 (as indicated by arrow 36). In this way, none of the SMTP servers 12 in the HACMP server cluster 10 are idle during normal operation, thereby providing efficient hardware resource usage. After processing the email, the antivirus programs 24-1 and 24-2 relay the email to the mail transfer applications 22-1 and 22-2, respectively.

Figure 2:
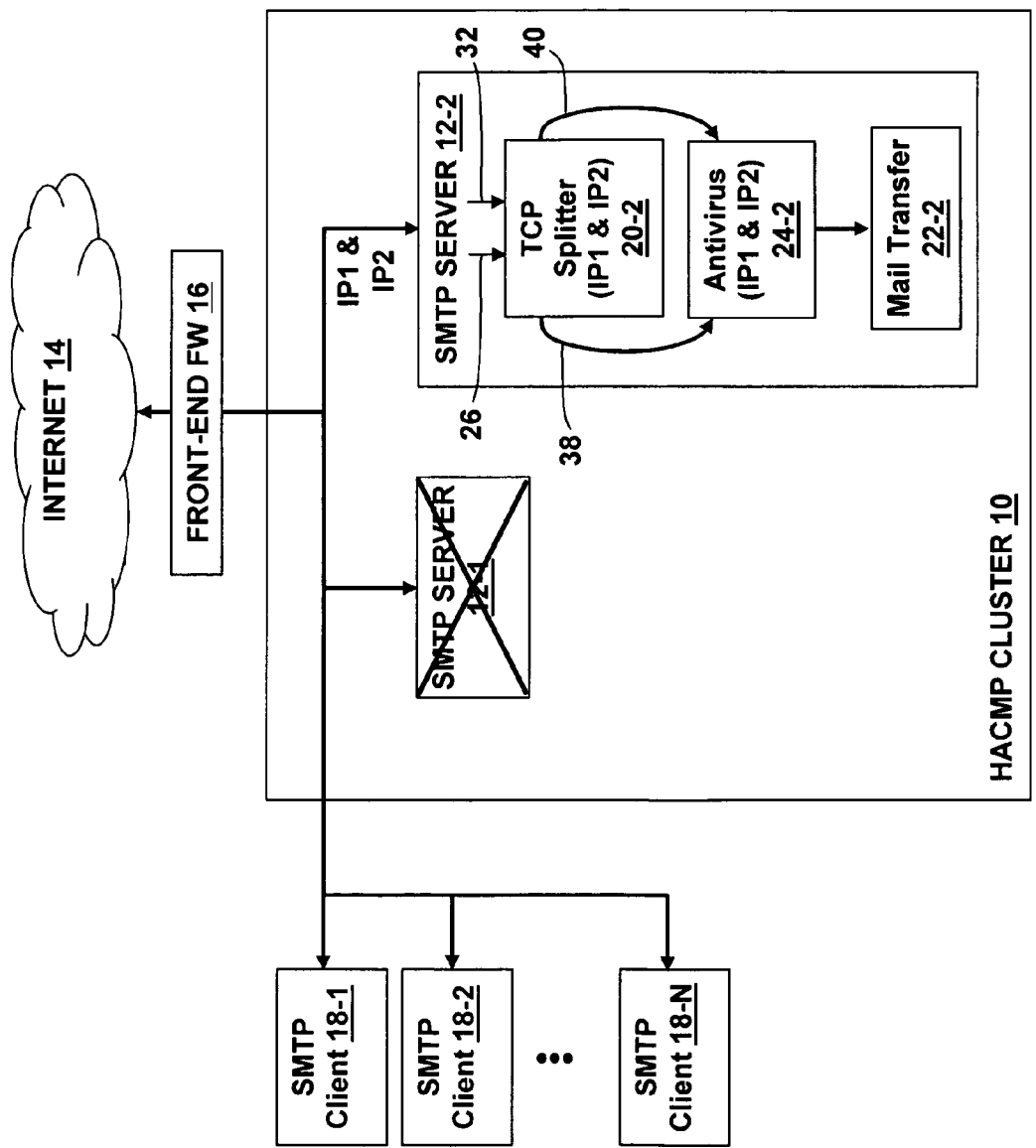
FIG. 2 depicts the illustrative HACMP server cluster of FIG. 1 when one of the servers has failed.

When a hardware failure occurs on one of the SMTP servers 12, the HACMP server cluster 10 provides for another one of the SMTP servers 12 to seamlessly take over the IP address of the failed SMTP server 12 for the SMTP clients 18. An example of this is depicted in FIG. 2. In particular, in FIG. 2, the SMTP server 12-1 has failed. In response, the IP address (IP1) of the failed SMTP server 12-1 is taken over by the SMTP server 12-2. Since there are no additional SMTP servers 12 in the HACMP server cluster 10, the TCP splitter 20-2 sends both the email stream 26 and the email stream 32 to the antivirus program 24-2 running on the SMTP server 12-2 as indicated by the arrows 38 and 40, respectively.

Figure 3:
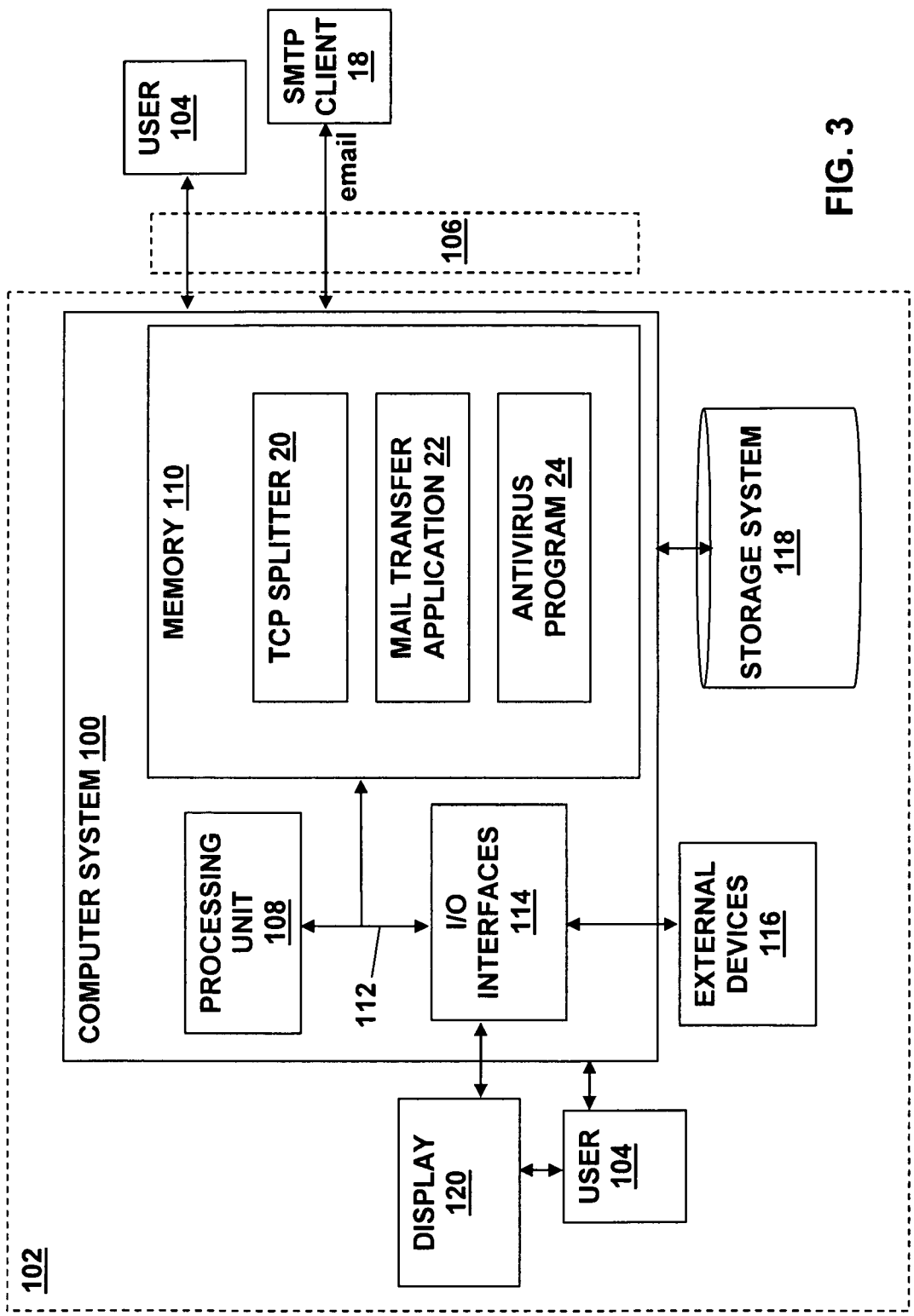
FIG. 3 depicts an illustrative computer system for implementing embodiment(s) of the present invention.

A computer system 100 (e.g., SMTP server) in accordance with an embodiment of the present invention is depicted in FIG. 3. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that offers a service for providing local load balancing for high-availability servers (e.g., TCP servers) in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as TCP splitter 20, antivirus program 24, and mail transfer application 22, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 3 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as computer program products) is a TCP splitter 20, an antivirus program 24, and mail transfer application 22, that operate as described above. In particular, the TCP splitter 20 is configured to provide load balancing by splitting incoming email streams from SMTP clients 18 (see also FIG. 1) among a plurality of different SMTP servers for processing (e.g., antivirus processing). The antivirus program 24 is configured in a known manner to identify and remove viruses and other deleterious code from email. The mail transfer application 22 operates in a known manner to transfer email to/from SMTP clients 18.

Figure 4:
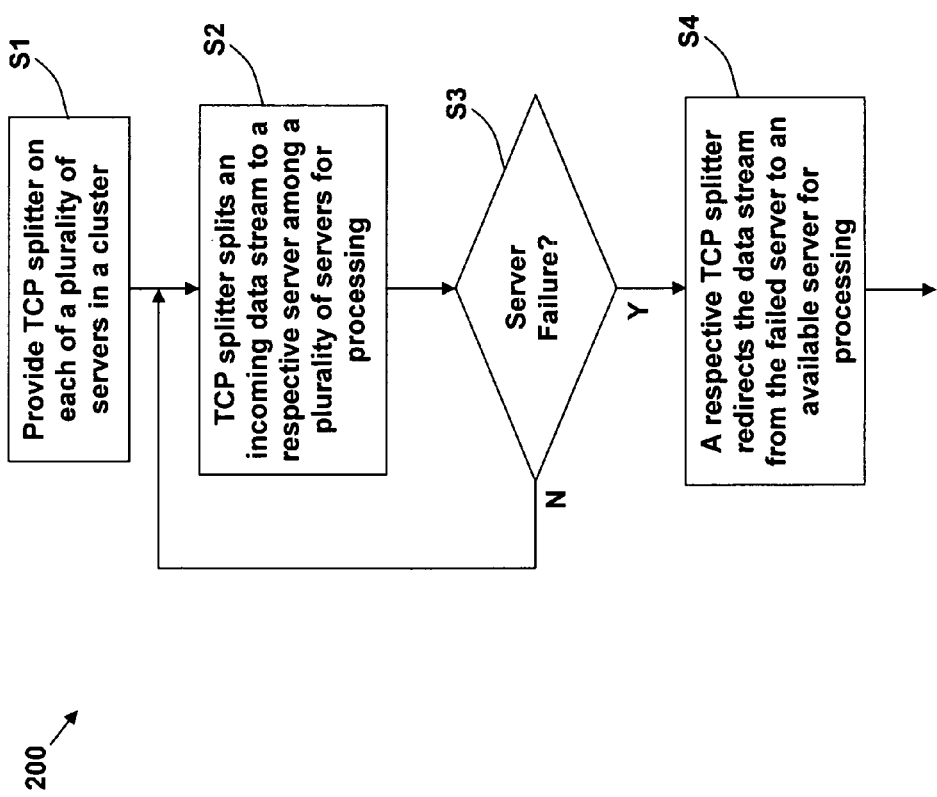
FIG. 4 depicts an illustrative flow diagram of a process in accordance with an embodiment of the present invention.

An illustrative flow diagram 200 of a process in accordance with an embodiment of the present invention is depicted in FIG. 4. In step S1, a TCP splitter is provided on each of a plurality of servers (e.g., SMTP servers) in a cluster. In step S2, a TCP splitter splits an incoming data stream (e.g., an email stream) to a respective server among a plurality of the servers for processing. Upon failure of a server (step S3), a respective TCP splitter redirects (step S4) the data stream from the failed server to an available server for processing.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing local load balancing for high-availability servers (e.g., TCP servers), as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for providing load balancing, comprising:
   providing a cluster of servers; and
   running a Transport Control Protocol (TCP) splitter on each server of the cluster of servers, wherein each TCP splitter is configured to split an incoming data stream to a respective server among the cluster of servers for processing such that no server of the cluster of servers is idle during a normal operation, and wherein the TCP splitter comprises a TCP proxy that listens on a port and is transparent to processes on a client system and transparent to processes on the cluster of servers, wherein, upon a failure of a server, a respective TCP splitter redirects the data stream from the failed server to an available server, and another server in the cluster takes over an IP address of the failed server.

2. The method of claim 1, wherein the servers comprise Simple Mail Transport Protocol (SMTP) servers.

3. The method of claim 1, wherein the data stream comprises an email stream.

4. The method of claim 1, wherein the processing is selected from the group consisting of: mail transfer and antivirus processing.

5. The method of claim 1, wherein the cluster comprises a high availability cluster of servers.

6. The method of claim 1, wherein each server in the cluster has a different routable Internet Protocol (IP) address.

7. A system for providing load balancing, comprising:
   a cluster of servers, each server including at least one computing device; and
   a Transport Control Protocol (TCP) splitter on each server of the cluster of servers, wherein each TCP splitter is configured to split, using the at least one computing device, an incoming data stream to a respective server among the cluster of servers for processing such that no server of the cluster of servers is idle during a normal operation, and wherein the TCP splitter comprises a TCP proxy that listens on a port and is transparent to processes on a client system and transparent to processes on the cluster of servers, wherein, upon a failure of a server, a respective TCP splitter redirects the data stream from the failed server to an available server, and another server in the cluster takes over an IP address of the failed server.

8. The system of claim 7, wherein the servers comprise Simple Mail Transport Protocol (SMTP) servers.

9. The system of claim 7, wherein the data stream comprises an email stream.

10. The system of claim 7, wherein the processing is selected from the group consisting of: mail transfer and antivirus processing.

11. The system of claim 7, wherein the cluster of servers comprises a high availability cluster of servers.

12. The system of claim 7, wherein each server in the cluster of servers has a different routable Internet Protocol (IP) address.

13. A program product stored on a computer readable storage medium for providing load balancing, the computer readable storage medium comprising program code for performing the steps of:

providing a Transport Control Protocol (TCP) splitter on each of a plurality of servers in a cluster of servers; and
 splitting, using a TCP splitter, an incoming data stream to a respective server among a plurality of the cluster of servers for processing such that no server of the cluster of servers is idle during a normal operation, and wherein the TCP splitter comprises a TCP proxy that listens on a port and is transparent to processes on a client system and transparent to processes on the cluster of servers, wherein, upon a failure of a server, a respective TCP splitter redirects the data stream from the failed server to an available server, and another server in the cluster takes over an IP address of the failed server.

14. The program product of claim 13, wherein the servers comprise Simple Mail Transport Protocol (SMTP) servers.

15. The program product of claim 13, wherein the data stream comprises an email stream.

16. The program product of claim 13, wherein the processing is selected from the group consisting of mail transfer and antivirus processing.

17. The program product of claim 13, wherein the cluster of servers comprises a high availability cluster of servers.

18. The program product of claim 13, wherein each server in the cluster of servers has a different routable Internet Protocol (IP) address.

19. A method for deploying an application for providing local load balancing, comprising:

providing a computer infrastructure being operable to:
 provide, using at least one computing device, a Transport Control Protocol (TCP) splitter on each of a plurality of servers in a cluster; and
 split, using a TCP splitter, an incoming data stream to a respective server among the cluster of servers for processing such that no server of the cluster of servers is idle during a normal operation, and wherein the TCP splitter comprises a TCP proxy that listens on a port and is transparent to processes on a client system and transparent to processes on the cluster of servers, wherein, upon a failure of a server, a respective TCP splitter redirects the data stream from the failed server to an available server, and another server in the cluster takes over an IP address of the failed server.

* * * * *